(12) United States Patent
Mukasa

(10) Patent No.: US 6,879,763 B2
(45) Date of Patent: Apr. 12, 2005

(54) REVERSE DISPERSION OPTICAL FIBER AND OPTICAL TRANSMISSION LINE USING REVERSE DISPERSION OPTICAL FIBER

(75) Inventor: Kazunori Mukasa, Chiba (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 287 days.

(21) Appl. No.: 10/186,740

(22) Filed: Jul. 2, 2002

(65) Prior Publication Data

US 2003/0095768 A1 May 22, 2003

(30) Foreign Application Priority Data

Aug. 27, 2001 (JP) ........................................ 2001-255740

(51) Int. Cl.[7] .............................. G02B 6/22; G02B 6/16
(52) U.S. Cl. ...................................... 385/127; 385/123
(58) Field of Search ................................. 385/123–127

(56) References Cited

U.S. PATENT DOCUMENTS

2002/0018631 A1 * 2/2002 Arai et al. .................. 385/127
2003/0091309 A1 * 5/2003 Hebgen et al. ............. 385/127
2003/0113084 A1 * 6/2003 Knudsen et al. ............ 385/127

FOREIGN PATENT DOCUMENTS

| EP | 1055945 A2 | * 11/2000 | ............ G02B/6/16 |
| JP | 9-211511 | 8/1997 | |

* cited by examiner

Primary Examiner—Brian Healy
Assistant Examiner—Michael P. Mooney
(74) Attorney, Agent, or Firm—Oblon, Spivak, McClelland, Maier & Neustadt, P.C.

(57) ABSTRACT

A reverse dispersion optical fiber having a small waveform distortion caused by non-linearity wherein an effective core area is made at least 50 $\mu$m$^2$ and a dispersion at a wavelength of the 1.55 $\mu$m band is made not more than −10 ps/nm/km and a dispersion management optical transmission line having a small waveform distortion obtained by connecting a positive dispersion optical fiber and that reverse dispersion optical fiber in that order along a direction of signal transmission and having a total dispersion of substantially zero.

7 Claims, 2 Drawing Sheets

REVERSE DISPERSION OPTICAL FIBER AND OPTICAL TRANSMISSION LINE USING REVERSE DISPERSION OPTICAL FIBER

BACKGROUND OF THE INVENTION

1. Field of the Invention

The present invention relates to an optical fiber and an optical transmission line using an optical fiber, more particularly relates to a reverse dispersion optical fiber having a low non-linearity suitable for wavelength division multiplex (WDM) transmission and an optical transmission line obtained by connecting such a reverse dispersion optical fiber and a positive dispersion optical fiber to reduce the total dispersion.

2. Description of the Related Art

With optical transmission being increased in speed and capacity, WDM transmission technology for transmitting a plurality of optical signals with different wavelengths multiplexed is in the spotlight as a key technology. In wavelength division multiplex transmission, however, the non-linearity in optical fiber due to the higher output of optical signals and to the interaction between the plurality of signal wavelengths has arisen as a new problem.

Among the non-linearity phenomena, the waveform distortion caused by self-phase modulation (SPM) or cross-phase modulation (XPM) is becoming a major problem.

Waveform distortion is inversely proportional to the effective core area (Aeff), so an increase in the effective core area has previously been sought in non-zero dispersion shift fibers (NZ-DSF). If the effective core area increases in a non-zero dispersion shift fiber, however, in general the bending loss or dispersion slope increase, so in practice the increase in the effective core area has been restricted.

Four-wave mixing (FWM), another non-linearity phenomenon, becomes remarkable when the dispersion is small, so an optical fiber with a small dispersion such as a non-zero dispersion shift fiber is disadvantageous in that point.

Therefore, to prevent four wave mixing in an optical transmission line by giving a certain large dispersion (wavelength dispersion) to the individual optical fibers while reducing the dispersion of the optical transmission line as a whole, comprised of a plurality of optical fibers connected together, close to zero, for example, Japanese Unexamined Patent Publication (Kokai) No. 9-211511 proposes an optical transmission line having a reverse dispersion optical fiber (RFD) connected as a cable-type dispersion compensation fiber to a positive dispersion optical fiber. This is also called a "dispersion management optical transmission line". In a dispersion management optical transmission line, a positive dispersion optical fiber having a small waveform distortion and a reverse dispersion optical fiber having a relatively large wavelength distortion and a reverse dispersion are connected at the front and rear, respectively. By introducing the signal into the front positive dispersion optical fiber to attenuate its power and then introducing it to the rear reverse dispersion optical fiber, the waveform distortion arising due to the non-linearity at the reverse dispersion optical fiber is made relatively small while reducing the total dispersion close to zero.

For example, the positive dispersion optical fiber and reverse dispersion optical fiber are given a large dispersion of about 16 to 22 ps/nm/km in terms of absolute value to suppress the four wave mixing. In that case, the dispersion slope of the positive dispersion optical fiber is compensated for by giving the reverse dispersion optical fiber a reverse dispersion slope. As a result, the positive dispersion optical fiber has an effective core area of about 70 to 130 $\mu m^2$, while the reverse dispersion optical fiber has an effective core area of about 20 to 30 $\mu m^2$, so there was a limit to reduction of the wavelength distortion caused by the non-linearity phenomena in the reverse dispersion optical fiber.

Recently, optical transmission lines emphasizing reduction of the waveform distortion over compensation of the dispersion slope have sometimes been demanded.

SUMMARY OF THE INVENTION

An object of the present invention is to provide a reverse dispersion optical fiber reduced in waveform distortion due to non-linearity by increasing the effective core area.

Another object of the present invention is to provide an optical transmission line reduced in waveform distortion using such a reverse dispersion optical fiber.

The present inventors engaged in various studies and simulations to realize a reverse dispersion optical fiber and an optical transmission line using such a reverse dispersion optical fiber to realize the above objects and discovered the characteristics and conditions for such a reverse dispersion optical fiber and optical transmission line. They further made and tested prototypes of such a reverse dispersion optical fiber and thereby realized the desired reverse dispersion optical fiber and optical transmission line using that reverse dispersion optical fiber.

As a result, the inventors discovered the reverse dispersion optical fiber of the present invention having an effective core area of not less than 50 $\mu m^2$ and a dispersion in the wavelength region of the 1.55 $\mu m$ band of not more than −10 ps/nm/km.

Such a reverse dispersion optical fiber is provided with a center core, a first side core formed at the outer circumference of the center core, a second side core formed at the outer circumference of the first side core, and a cladding layer formed at the outer circumference of the second side core.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

A preferred embodiment of the present invention will be described in detail below while referring to the attached figures.

Figure 1A:
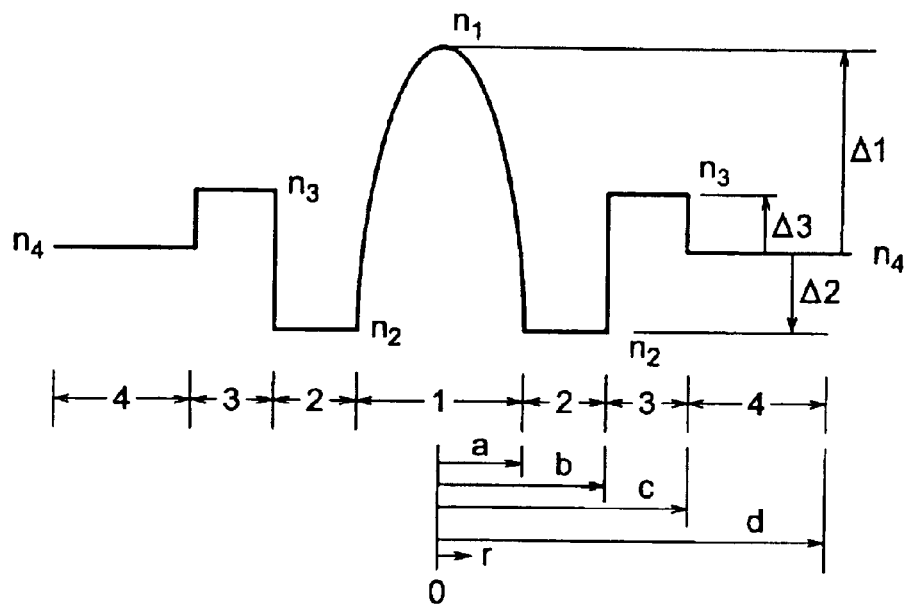
FIG. 1A is a graph of the refractive index profile of a reverse dispersion optical fiber according to an embodiment of the present invention.
Figure 1B:
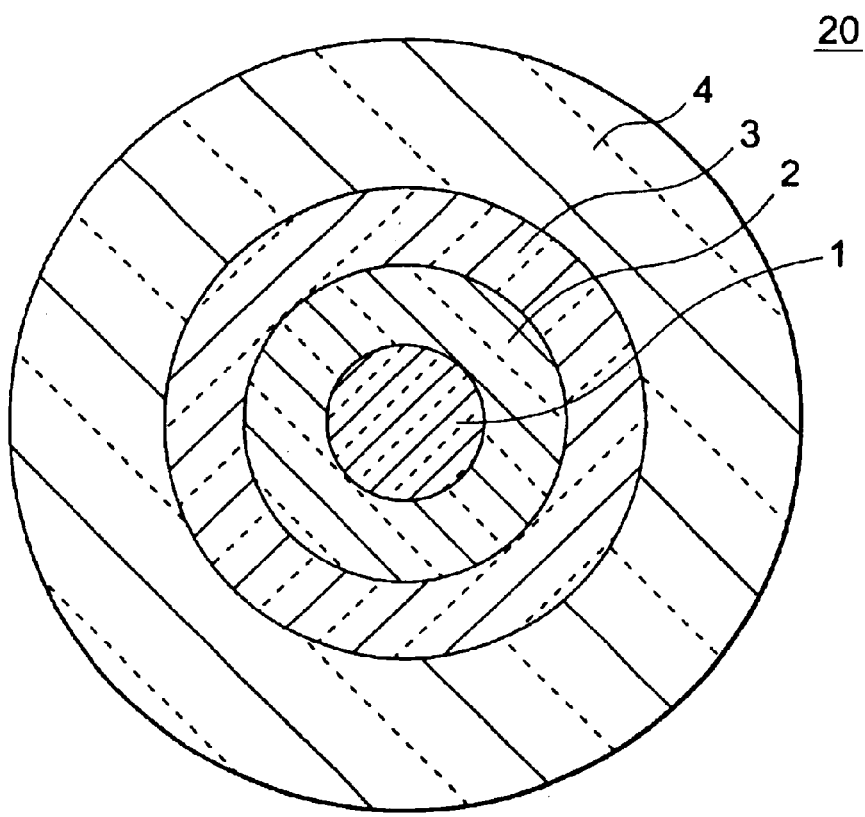
FIG. 1B is a cross-sectional view of the configuration of a reverse dispersion optical fiber having the refractive index profile illustrated in FIG. 1A.

FIG. 1A is a view illustrating the refractive index profile of a reverse dispersion optical fiber according to an embodiment of the present invention, while FIG. 1B is a cross-sectional view of the configuration of a reverse dispersion optical fiber having the refractive index profile illustrated in FIG. 1A.

The reverse dispersion optical fiber of this embodiment is comprised of a center core 1 of a diameter 2a, a first side core 2 of an outer diameter (diameter) 2b at the outside of the center core 1, and a second side core 3 of an outer diameter (diameter) 2c at the outside of the first side core 2 in that order and further a cladding layer 4 of an outer diameter (diameter) 2d at the outside of the second side core 3.

The refractive index profile is that of a "W" plus the second side core 3, so in the present specification, the reverse dispersion optical fiber of this embodiment will be called a "W+segment core" type optical fiber.

differences defined by the above equation. Note that the relative refractive index difference Δ1 of the center core 1 to the cladding layer 4 is greater than 0, the relative refractive index difference Δ2 of the first side core 2 to the cladding layer 4 is less than 0, and the relative refractive index difference Δ3 of the second side core 3 to the cladding layer 4 is greater than 0.

In the reverse dispersion optical fiber of the present embodiment, the effective core area is set to at least 50 $\mu m^2$ and the dispersion value at the wavelength of the 1.55 $\mu m$ band is set to not more than −10 ps/nm/km. The results of simulations are shown in Table 1.

TABLE 1

| No. | Δ1 (%) | α | Δ2 (%) | Δ3 (%) | a:b:c | Core diameter ($\mu m$) | Dispersion (ps/nm/km) | Slope (ps/nm²/km) | Aeff ($\mu m^2$) | λc (nm) | Bending 20 (dB/m) |
|---|---|---|---|---|---|---|---|---|---|---|---|
| 1 | 0.55 | 10 | −0.30 | 0.15 | 0.40:0.60:1 | 15.0 | −13.7 | 0.073 | 59.2 | 1487 | 9.0 |
| 2 | 0.60 | 6 | −0.50 | 0.35 | 0.35:0.65:1 | 16.0 | −17.8 | 0.081 | 56.8 | 1486 | 8.0 |
| 3 | 0.55 | 10 | −0.45 | 0.20 | 0.35:0.60:1 | 16.4 | −14.4 | 0.054 | 55.1 | 1495 | 8.0 |
| 4 | 0.60 | 5 | −0.40 | 0.25 | 0.45:0.65:1 | 16.3 | −13.0 | 0.047 | 53.2 | 1486 | 8.0 |
| 5 | 0.75 | 2 | −0.40 | 0.25 | 0.40:0.65:1 | 15.4 | −19.7 | 0.071 | 52.5 | 1465 | 7.0 |
| 6 | 0.60 | 10 | −0.60 | 0.25 | 0.40:0.62:1 | 15.0 | −20.6 | 0.059 | 52.1 | 1488 | 8.0 |
| 7 | 0.60 | 10 | −0.60 | 0.20 | 0.35:0.58:1 | 15.7 | −20.8 | 0.053 | 51.1 | 1455 | 7.0 |
| 8 | 0.65 | 2 | −0.55 | 0.25 | 0.45:0.67:1 | 15.8 | −12.4 | 0.031 | 50.8 | 1474 | 7.0 |
| 9 | 0.55 | 7 | −0.60 | 0.20 | 0.40:0.60:1 | 16.4 | −13.3 | 0.025 | 50.5 | 1463 | 6.0 |
| 10 | 0.65 | 5 | −0.40 | 0.20 | 0.35:0.60:1 | 15.8 | −21.8 | 0.064 | 55.3 | 1460 | 7.0 |
| 11 | 0.65 | 6 | −0.50 | 0.20 | 0.35:0.58:1 | 16.0 | −25.2 | 0.060 | 50.2 | 1480 | 9.0 |

In Table 1, the symbols have the following meanings:
Δ1 to Δ3: Relative refractive index difference
α: Refractive index distribution coefficient of center core 1
a:b:c: Ratio of radius "a" of second core 1 and radius "b" of first side core 2 to radius "c" of second side core 3
Core diameter: Diameter of core portion including center core 1, first side core 2, and second side core 3, that is, diameter of second side core 3
Dispersion: Dispersion value
Slope: Dispersion slope
Aeff: Effective core area
λc: Cutoff wavelength (value measured in length used)
Bending 20: Increase in transmission loss when bending reverse dispersion optical fiber by 20 mmΦ

When the refractive indexes of the center core 1, first side core 2, second side core 3, and cladding layer 4 are $n_1$, $n_2$, $n_3$, and $n_4$, respectively, the relative refractive index differences Δ1, Δ2, and Δ3 are defined by the following equations:

$$\Delta 1 = \frac{n_1^2 - n_4^2}{2n_1^2} \cong \frac{n_1 - n_4}{n_1} \quad (1\text{-}1)$$

$$\Delta 2 = \frac{n_2^2 - n_4^2}{2n_2^2} \cong \frac{n_2 - n_4}{n_2} \quad (1\text{-}2)$$

$$\Delta 3 = \frac{n_3^2 - n_4^2}{2n_3^2} \cong \frac{n_3 - n_4}{n_3} \quad (1\text{-}3)$$

The cladding layer 4 is formed from silica glass. The center core 1 and the second side core 3 are doped with for example germanium (Ge) to increase the refractive indexes over than the refractive index $n_4$ of the cladding layer 4. The first side core 2 is doped with for example fluorine to reduce the refractive index below the refractive index $n_4$ of the cladding layer 4.

The refractive index profile of the reverse dispersion optical fiber is expressed by the relative refractive index The above refractive index distribution coefficient α is a parameter defining the refractive index profile of the center core 1. The profile is defined by the following equation. In equation 2, the relative refractive index difference Δ1 is the relative refractive index difference of the center core 1 to the cladding layer 4, "a" is the radius of the center core 1, and "r" is the distance from the core center 0 to the core portion in the radial direction.

$$n(r)\alpha\left[1 - 2\Delta_0\left(\frac{r}{a}\right)^\partial\right]$$

where, $\Delta_0$ is the relative refractive index difference between the center core and cladding layer.

As shown in Table 1, in almost all cases, it is possible to achieve a dispersion slope of not more than 0.08 ps/nm²/km. Further, it is possible to keep the bending loss at 20 mmΦ at not more than 10 dB/m while maintaining the cutoff wavelength λc at not more than 1500 nm. Further, by keeping the relative refractive index difference Δ1 at a low value of not more than 0.75%, it is possible to expect low loss characteristics or a low polarization mode dispersion (PMD) characteristic.

EXAMPLES

The efficacy of the reverse dispersion optical fiber of the above embodiment was confirmed by the examples shown below.

Reverse dispersion optical fibers of the present embodiment were fabricated using optical fibers of the refractive index profile "W+segment core" shown in FIGS. 1A and 1B and aiming at reverse dispersion optical fibers of Simulation Nos. 3 and 7 of Table 1 having refractive index distribution coefficients α about 10 so as to obtain low non-linearity reverse dispersion optical fibers.

Table 2 shows the optical transmission characteristics at the wavelength 1550 nm of Examples 1 and 2.

Table 2 also shows a typical positive dispersion optical fiber, that is, a cutoff shifted fiber (CSF), and reverse dispersion optical fibers of Comparative Examples 1 and 2.

TABLE 2

|  | Aeff ($\mu m^2$) | Trans. loss (dB/km) | Dispersion (ps/nm/km) | Slope (ps/nm$^2$/km) | λc (nm) | Bending loss (dB/m) | PMD (ps/km$^{1/2}$) |
|---|---|---|---|---|---|---|---|
| CSF | 85.0 | 0.190 | 18.0 | 0.060 | 1500 | 2.0 | 0.04 |
| Comp. Ex. 1 | 24.0 | 0.240 | −24.0 | −0.065 | 820 | 10.0 | 0.07 |
| Comp. Ex. 2 | 21.0 | 0.260 | −40.0 | −0.130 | 820 | 5.0 | 0.10 |
| Ex. 1 | 54.9 | 0.218 | −14.6 | 0.052 | 1483 | 9.0 | 0.04 |
| Ex. 2 | 51.9 | 0.215 | −20.6 | 0.057 | 1453 | 7.5 | 0.03 |

As will be understood from Table 2, the effective core areas of Comparative Examples 1 and 2 were 24.0 and 21.0, while the effective core areas of Examples 1 and 2 were both more than 50 $\mu m^2$ or larger than those of the reverse dispersion optical fibers of Comparative Examples 1 and 2. Further, the dispersions were less than −10 ps/nm/km.

Figure 2:
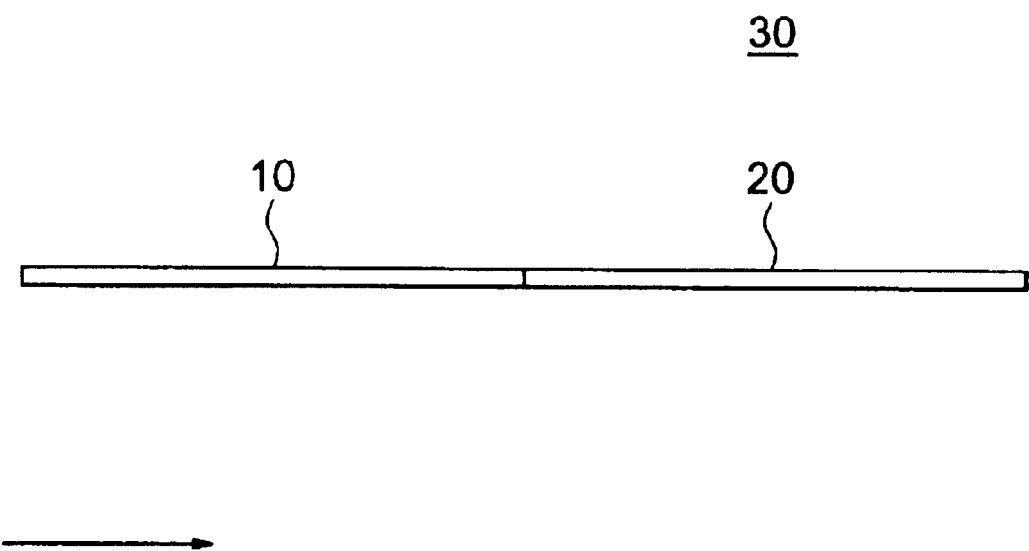
FIG. 2 is a view of the configuration of a cable-type dispersion compensation fiber formed by connecting the reverse dispersion optical fiber of an embodiment of the present invention and a positive dispersion optical fiber.

Since the reverse dispersion optical fibers of the present embodiment are increased in effective core area and small in dispersion, as illustrated in FIG. 2, if connecting a positive dispersion optical fiber 10 having a small waveform distortion at the front and a reverse dispersion optical fiber 20 of the present embodiment at the rear and using the reverse dispersion optical fiber 20 as a line-type dispersion compensation fiber 30, it is possible to reduce the total dispersion to about zero at a wavelength of the 1.55 $\mu m$ band. Further, if using the reverse dispersion optical fiber of the present embodiment, it becomes possible to suppress signal noise due to four wave mixing.

Further, the transmission loss at a wavelength of 1550 nm is kept low to not more than 0.22 dB/km, the polarization mode dispersion is kept to not more than 0.05 ps/km$^{1/2}$, and the cutoff wavelength λc, dispersion slope, and other characteristics are also good.

Next, the cutoff shifted fiber and reverse dispersion optical fibers of Comparative Examples 1 and 2 and the cutoff shifted fiber and reverse dispersion optical fibers of Examples 1 and 2, all shown in Table 2, were connected to form dispersion management optical transmission lines which were then measured as to transmission characteristics at a wavelength of 1550 nm. The results are shown in Table 3.

In Table 3, "standardized waveform distortion" indicates the magnitude of the waveform distortion due to non-linearity by an absolute value based on the waveform distortion of an optical transmission line of a combination of "CSF+RDF of Comp. Ex. 1".

TABLE 3

|  | Trans. loss (dB/km) | Dispersion (ps/nm/km) | Slope (ps/nm$^2$/km) | Standardized waveform distortion |
|---|---|---|---|---|
| CSF + Conv. RDF1 | 0.221 | 0 | 0.006 | 1 |
| CSF + Conv. RDF2 | 0.212 | 0 | 0.001 | 0.92 |
| CSF + Ex. 1 | 0.205 | 0 | 0.056 | 0.77 |
| CSF + Ex. 2 | 0.202 | 0 | 0.059 | 0.76 |

As shown in Table 3, if the reverse dispersion optical fibers of Examples 1 and 2 of the present invention are used, it is possible to suppress the standardized waveform distortion to about ¾ that of the case of use of the reverse dispersion optical fibers of the comparative examples. Further, since the transmission loss is also small, it is possible to reduce the strength of the input signal light. This is also advantageous in suppressing the non-linearity.

Note that the value of the dispersion slope of the reverse dispersion optical fiber+cutoff shifted fiber lines of the present embodiment are 0.056 ps/nm$^2$/km and 0.059 ps/nm$^2$/km or larger than the case of use of the reverse dispersion optical fibers of the comparative examples, but these are allowable values when compared with a non-zero dispersion shift fiber.

Summarizing the above below:

(1) Effective Core Area and Dispersion

By making the effective core area of the reverse dispersion optical fiber at least 50 $\mu m^2$ and making the dispersion not more than −10 ps/nm/km, it is possible to ease the waveform distortion due to non-linearity and possible to suppress the occurrence of four wave mixing.

(2) Dispersion Slope of Reverse Dispersion Optical Fiber

The dispersion slope of a positive dispersion optical fiber is about 0.06 to 0.08 ps/nm$^2$/km, so if the dispersion slope of the reverse dispersion optical fiber is made not more than 0.100 ps/nm$^2$/km, when connecting a positive dispersion optical fiber and a reverse dispersion optical fiber to form a dispersion management optical transmission line, it is possible to keep or suppress the dispersion slope in the dispersion management optical fiber as a whole.

In general, if the effective core area is made larger, the dispersion slope becomes larger, so as explained above it is preferable to keep the dispersion slope extremely small within the range meeting the condition of an effective core area of at least 50 $\mu m^2$. The dispersion slopes of the embodiment shown in Table 2 and Table 3 were 0.052 to 0.059 ps/nm$^2$/km.

(3) Cutoff Wavelength λc

If the cutoff wavelength λc is made not more than 1500 nm, it is possible to compensate for a single mode operation in a broad band from 1500 to 1650 nm.

(4) Bending Loss

In general, if the effective core area is increased, the bending loss easily becomes larger, but making the effective core area at least 50 $\mu m^2$ and making the bending loss a low value of not more than 10 dB/m is preferable in preventing an increase in the transmission loss etc. when connecting a positive dispersion optical fiber and a reverse dispersion optical fiber to form an optical transmission line.

(5) Transmission Loss and Polarization Mode Dispersion

Further, making the transmission loss not more than 0.30 dB/km and making the polarization mode dispersion not more than 0.10 ps/km$^{1/2}$ are preferable for improving the transmission characteristics.

(6) Relative Refractive Index Difference and Refractive Index Distribution Coefficient α

Relative Refractive Index Difference Δ1

The relative refractive index difference Δ1 of the center core 1 to the cladding layer 4 is preferably 0.5 to 0.9%, while the refractive index distribution coefficient α of the center core 1 is preferably 1.5 to 12.0.

The relative refractive index difference Δ1 is preferably small to reduce the transmission loss or the polarization mode dispersion. The reason why the relative refractive index difference Δ1 is made 0.5 to 0.9% is that the absolute value of the dispersion of the reverse dispersion optical fiber becomes smaller than 10 ps/nm/km. If the relative refractive index difference Δ1 is made larger than 0.9%, the effective core area becomes smaller than 50 $\mu m^2$.

The reason for making the refractive index distribution coefficient α of the center core 1 1.5 to 12.0 is that if the coefficient α is smaller than 1.5, the transmission loss increases when the effective core area is increased to more than 50 $\mu m^2$, while if the coefficient α is made larger than 12.0, the dispersion slope becomes larger than 0.100 ps/nm²/km or the cutoff wavelength λc becomes larger than 1500 nm.

Relative Refractive Index Difference Δ2

The relative refractive index difference Δ2 of the first side core 2 to the cladding layer 4 is preferably −0.7 to −0.1%.

The reason is that when the effective core area is increased to more than 50 $\mu m^2$, if the relative refractive index difference Δ2 is made smaller than −0.7%, the bending loss becomes extremely large, while if the relative refractive index difference Δ2 is made larger than −0.1%, the dispersion slope becomes larger than 0.100 ps/nm²/km.

Relative Refractive Index Difference Δ3

The relative refractive index difference Δ3 of the second side core 3 to the cladding layer 4 is preferably 0.1 to 0.4%.

The reason is that if the relative refractive index difference Δ3 is smaller than 0.1%, the bending loss at 20 mmΦ becomes larger than 10 dB/m, while if the relative refractive index difference Δ3 is larger than 0.4%, the cutoff wavelength λc exceeds 1500 nm.

(7) Outer Diameter Ratio

The ratio (a/c) of the outer diameter (2a) of the center core 1 to the outer diameter (2c) of the second side core 3 is preferably 0.30 to 0.50. The reason is that while Table 1 shows the a/c as 0.35 to 0.45, if the a/c is less than 0.30, the bending loss at 20 mmΦ becomes larger than 10 dB/m, while if the a/c is larger than 0.50, the cutoff wavelength λc becomes larger than 1500 nm or the dispersion slope becomes larger than 0.100 ps/nm²/km.

The ratio (b/c) of the outer diameter (2b) of the first side core 2 to the outer diameter (2c) of the second side core 3 is preferably 0.55 to 0.70. The reason is that, while Table 1 shows the b/c as 0.58 to 0.67, for the same reasons as explained for the range of a/c, with a range of b/c of 0.55 to 0.70, the bending loss at 20 mmΦ becomes not more than 10 dB/m, while the cutoff wavelength λc becomes not more than 1500 nm.

(8) Optical Transmission Line

As explained in (2), the dispersion slope of a positive dispersion optical fiber is about 0.06 to 0.80 ps/nm²/km, so if the dispersion slope of the reverse dispersion optical fiber is made less than 0.10 ps/nm²/km, if the positive dispersion optical fiber and reverse dispersion optical fiber are connected to form an optical transmission line (dispersion management optical transmission line), the total dispersion becomes about zero, four wave mixing due to the non-linearity of the optical transmission line is suppressed, and the waveform distortion can be reduced.

The reverse dispersion optical fiber of the present invention exhibits the effect of a smaller wavelength distortion due to non-linearity of the reverse dispersion optical fiber.

By connecting the reverse dispersion optical fiber of the present invention as a cable-type dispersion compensation fiber with a positive dispersion optical fiber to form a dispersion management optical transmission line, it is possible to reduce the total dispersion to about zero at the wavelength of the 1.55 $\mu$m band and possible to reduce the wavelength distortion due to non-linearity. If using the reverse dispersion optical fiber of the present invention, the signal noise due to four wave mixing can of course also be suppressed.

The reverse dispersion optical fiber of the present invention and the cable-type dispersion compensation fiber (dispersion management optical transmission line) using this reverse dispersion optical fiber are not limited to the above embodiment and examples. Persons skilled in the art may make various modifications within the scope of the technical idea of the present invention. These are understood as being included in the attached claims.

While the invention has been described with reference to specific embodiments chosen for purpose of illustration, it should be apparent that numerous modifications could be made thereto by those skilled in the art without departing from the basic concept and scope of the invention.

The present disclosure relates to subject matter contained in Japanese Patent Application No. 2001-255740, filed on Aug. 27, 2001, the disclosure of which is expressly incorporated herein by reference in its entirety.

What is claimed is:

1. A reverse dispersion optical fiber provided with:

a center core, a first side core formed at an outer circumference of said center core, a second side core formed at an outer circumference of said first side core, and a cladding layer formed at an outer circumference of said second side core; wherein an effective core area is at least 50 $\mu m^2$;

a dispersion value at a wavelength of the 1.55 $\mu$m band is not more than −10 ps/nm/km, a cutoff wavelength is not more than 1500 nm, a bending loss at 20 mmΦ is not more than 10 dB/m, a transmission loss at a wavelength of the 1.55 $\mu$m band is not more than 0.30 dB/km, and a polarization mode dispersion is not more than 0.10 ps/km$^{1/2}$.

2. A reverse dispersion optical fiber as set forth in claim 1, wherein a dispersion slope at a wavelength of the 1.55 $\mu$m band is no more than 0.100 ps/nm²/km.

3. A reverse dispersion optical fiber as set forth in claim 1, wherein:

a relative refractive index difference Δ1 of said center core to said cladding layer is 0.5 to 0.9%, a refractive index distribution coefficient α of said center core is 1.5 to 12.0, a relative refractive index difference Δ2 of said first side core to said cladding layer is −0.7 to −0.1%, a relative refractive index difference Δ3 of said second side core to said cladding layer is 0.1 to 0.4%, a ratio (a/c) of an outer diameter (2a) of said center core to an outer diameter (2c) of said second side core is 0.30 to 0.50, and a ratio (b/c) of an outer diameter (2b) of said first side core to an outer diameter (2c) of said second side core is 0.55 to 0.70.

4. An optical transmission line comprising a positive dispersion optical fiber and a reverse dispersion optical fiber connected along a direction of signal transmission and reduced in total dispersion at a wavelength of the 1.55 μm band of substantially zero, wherein said reverse dispersion optical fiber is provided with a center core, a first side core formed at an outer circumference of said center core, a second side core formed at an outer circumference of said first side core, and a cladding layer formed at an outer circumference of said second side core, has an effective core area of at least 50 μm$^2$, has a dispersion value at a wavelength of the 1.55 μm band of not more than −10 ps/nm/km, has a cutoff wavelength of not more than 1500 nm, has a bending loss at 20 mmΦ of not more than 10 dB/m, has a transmission loss at a wavelength of the 1.55 μm band of not more than 0.30 dB/km, and a polarization mode dispersion of not more than 0.10 ps/km$^{1/2}$.

5. An optical transmission line as set forth in claim 4, wherein said reverse dispersion optical fiber has a dispersion slope at a wavelength of the 1.55 μm band of not more than 0.100 ps/nm$^2$/km.

6. An optical transmission line as set forth in claim 4, wherein said positive dispersion optical fiber has a dispersion slope at a wavelength of the 1.55 μm band of 0.06 to 0.08 ps/nm$^2$/km.

7. An optical transmission line as set forth in claim 4, wherein said reverse dispersion optical fiber has:

a relative refractive index difference Δ1 of said center core to said cladding layer of 0.5 to 0.9%, a refractive index distribution coefficient α of said center core of 1.5 to 12.0, a relative refractive index difference Δ2 of said first side core to said cladding layer of −0.7 to −0.1%, a relative refractive index difference Δ3 of said second side core to said cladding layer of 0.1 to 0.4%, a ratio (a/c) of an outer diameter (2a) of said center core to an outer diameter (2c) of said second side core of 0.30 to 0.50, and a ratio (b/c) of an outer diameter (2b) of said first side core to an outer diameter (2c) of said second side core of 0.55 to 0.70.

* * * * *